ns of the present invention the starting ma-
United States Patent Office 3,836,585
Patented Sept. 17, 1974

3,836,585
DEHALOGENATION OF DIHALO-5H-DIBENZO-
CYCLOHEPTENONES USING CHROMOUS
CHLORIDE
Edward W. Tristram, Watchung, and Jan ten Broeke,
Somerset, N.J., assignors to Merck & Co., Inc., Rahway, N.J.
No Drawing. Continuation-in-part of abandoned application Ser. No. 818,838, Apr. 23, 1969. This application Jan. 22, 1973, Ser. No. 325,685
Int. Cl. C07c 49/76, 49/82
U.S. Cl. 260—590          1 Claim

ABSTRACT OF THE DISCLOSURE

There is provided a novel method of preparing dibenzocycloheptenones having, optionally, substituents in either or both of the benzo-nuclei. The method comprises conversion of the appropriate stilbene carboxylic acid to the corresponding acid chloride, halogenation of the bridge double bond, ring closure and dehalogenation.

The present application is a continuation-in-part of our copending application Ser. No. No. 818,838, filed Apr. 23, 1969 and now abandoned.

FIELD OF THE INVENTION

Process for the preparation of precursors for 5H-dibenzo[a,d]cycloheptenes.

DESCRIPTION OF THE PRIOR ART 5H-dibenzo[a,d]cycloheptenones are useful as precursors in the preparation of certain pharmacologically active compounds. In particular, they are useful in the preparation of compounds having tranquilizing and antidepressant activity together with a certain measure of antihistamine activity. Such compounds, notably, 3-alkylsulfonyl-5-(tertiary aminopropylidene) - 5H - dibenzo[a,d]cycloheptenes and the like are disclosed in U.S. Pat. 3,275,689 to Engelhardt.

It was found desirable to seek general modes of preparation of 5H-dibenzo[a,d]cyclohepten-5-one which bear a variety of substituents in the benzo portions of the nucleus. In one mode of synthesis known to the art, the desired stilbene carboxylic acid is hydrogenated, subjected to ring closure, and dehydrogenated to yield the desired intermediate. This procedure of hydrogenation followed by dehydrogenation is a commercially undesirable sequence. Different routes were therefore to be sought using materials and procedures which were more compatible with ordinary industrial processes.

SUMMARY OF THE INVENTION

The 5H-dibenzo[a,d]cyclohepten-5-ones produced by the processes of the present invention are useful as intermediates in the preparation of the tranquilizers and antidepressants disclosed in U.S. Pat. 3,275,689.

The basic reaction scheme of the novel process is set forth in the reaction scheme below. X and Y are optionally substituents in any of the otherwise unsubstituted positions of the benzo nuclei, Q and Z are halogen.

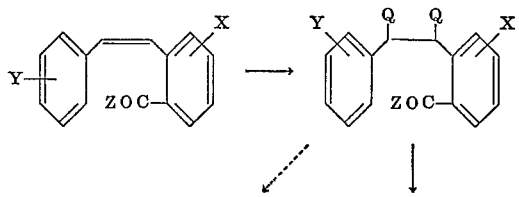

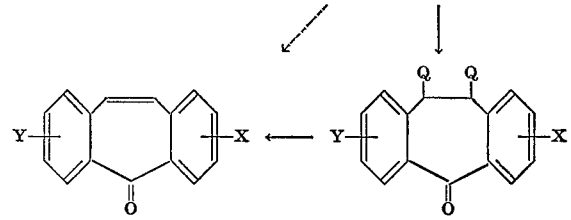

In the process of the present invention, stilbene carboxylic acid is converted to the corresponding acid halide, and the bridge double bond halogenated, suitably with a Lewis acid. The resulting 2-(2-phenyl-1,2-dihaloethyl)benzoyl halide is then cyclized using aluminum chloride to produce a 10,11-dihalo-10,11-dihydro-5H-dibenzo[a,d]cycloheptene-5-one. The elements of one mole of halogen are then removed utilizing either a chromium chloride catalyst or a weak base. The use of strong base is not recommended since such reagents will give rise to an 11-halocycloheptenone.

In yet another modification of the present invention the dihalo acid halide may be directly converted to the desired 5H-dibenzo[a,d]cyclohepten-5-one by reaction with excess aluminum chloride preferably in the presence of a halogen carrier, such as phosphorus trichloride.

DESCRIPTION OF THE PREFERRED EMBODIMENTS

In the process of the present invention the starting material is the appropriate stilbene carboxylic acid (1)

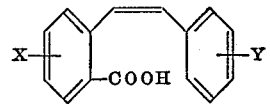

wherein X and Y may be hydrogen, halo, such as bromo, chloro, or fluoro; nitro; alkyl suitably lower alkyl having 1–5 carbon atoms such as methyl, ethyl, propyl, isopropyl or butyl, alkoxy, suitably lower alkoxy wherein the alkyl moiety thereof contains between 1 and 5 carbon atoms; sulfonyl, or substituted sulfonyl such as alkylsulfonyl wherein the alkyl moiety contains 1–5 carbon atoms.

The carboxylic acid is then converted to the corresponding acid halide, such as the acid chloride. Suitably the reaction is carried out by treatment with thionyl chloride, between 2 and 6 moles of thionyl chloride, suitably about 4 to 5 moles of thionyl chloride per mole of carboxylic acid are preferred, in the presence of a base, preferably an organic base such as pyridine and the like, in an anhydrous water immiscible organic solvent such as benzene, toluene, methylene chloride and the like. In one modification of the invention the mixture is initially a slurry, and is heated to reflux at which temperature a clear solution is obtained. After heating under reflux for from about 15 minutes to about 2 hours, suitably for about 30 minutes, the solution is cooled, suitably to ice water bath temperature and the product isolated. In the preferred modification, a non-polar organic solvent, such as hexane is added to decrease the solubility of the product, which is separated by filtration.

The stilbene carbonyl halide for example, methyl sulfonyl stilbene carbonyl chloride is then halogenated at the bridge double bond. Halogenation may be by treatment with elemental chlorine or bromine or with other brominating agents known to the art, for example, pyridinium bromide perbromide or the like. It is preferred however, to utilize bromine in an inert water immiscible solvent, suitably a nitro lower alkane such as nitroethane or a polyhaloalkane for example methylene chloride or carbon tetrachloride. It is found desirable to utilize a small excess of the halogenating agent, that is to say an excess of between 5 and 15 percent suitably about 10% of the halogen relative to the acid halide.

The presence of excess halogen, though desirable in this stage is detrimental in the text. It should therefore be removed. This may be achieved by nitrogen purging, partial distillation of solvent or both sequentially. The dihalo-acid chloride, for example the dihaloalkylsulfonyl stilbene carbonyl chloride is then converted into the corresponding 5H-dibenzocycloheptenone by one of two alternate routes. In the first route the conversion may be carried out directly by treatment with a Lewis acid in the presence of phosphorous trichloride. Preferably, aluminum chloride is utilized as the Lewis acid. In this reaction the ring closure to the corresponding dihalodibenzocycloheptenone and the dehalogenation thereof to give the desired product may be caused to occur in a single reaction stage.

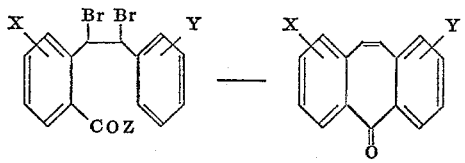

In this process there is prepared a solution of the appropriate dihalo acid chloride, for example dibromophenethylbenzoylchloride, in a reaction inert organic solvent, suitably methylene chloride, carbon tetrachloride, nitroethane, or the like to which there is added a substantial excess of aluminum chloride in a similar solvent. It is preferred to use between 5 and 15, suitably about 10 moles of aluminum chloride per mole of acid chloride, preferably, but not essentially, between 0.5 and 10 suitably 1 moles of phorphorous trichloride per mole of acid chloride is then added to the reaction mixture. It is preferred to operate with an initially cold (i.e. ca 0°–5° C.) solution of acid chloride. The reaction is then permitted to proceed, suitably at ambient temperature, that is to say, between about 10 and 30° C. for from about 3 to about 10 suitably for about 5 hours preferably with agitation. It is further preferred to carry out the reaction in an anhydrous, suitably inert atmosphere, such as a dry nitrogen atmosphere. The reaction mixture is then worked up. In a suitable mode of work up, the solvents are removed by distillation under reduced pressure at ambient temperature and the residual mass quenched with water, filtered, washed with a small amount of water, saturated aqueous sodium bicarbonate, and again with water, followed by drying in vacuo at moderate temperatures that is to say, at between about 30° C. and about 60° C. suitably, about 50° C. to yield the desired 5H-dibenzo[a,d]cyclohepten-5-one.

In an alternate mode of proceeding, the dihalo acid chloride is not isolated but reacted in situ with an excess of aluminum chloride in a reaction inert organic solvent. The degree of excess in this modification is not as great as that utilized in the first mode set forth above. There are used between 2 and 5 moles suitably between about 2.5 and 5 moles of aluminum chloride per mole of carboxylic acid charged. The reaction is permitted to proceed at ambient temperatures for about 15 to about 25 hours suitably to about 20 hours, and the product isolated. Alternatively it may proceed under reflux for from about 3 to about 5 hours. In the preferred mode of isolation, the reaction mixture is cooled to below 0° C. suitably in an ice/methanol bath, vigorously stirred, and quenched with water. The resultant slurry is filtered, the residue washed with a water immiscible organic solvent, suitably a polar solvent such as chloroform or methylene chloride and the combined organic filtrate concentrated under reduced pressure to yield the desired dihalo-5H-dibenzocyclohepten-5-one, in a degree of purity sufficient for the next step of the reaction.

The dehalogenation to yield the desired 5H-dibenzocycloheptenone may be carried out by reacting the dihalo compound with a weak base, for example, pyridine, triethanolamine, sodium acetate and the like. It is, however, preferred to carry out the halogenation step by reacting the dihalo compound with chromous chloride. There may be utilized from about 2 to about 5 moles of chromous chloride per mole of dihalo compound. There is prepared a solution of the dihalo-5H-dibenzocycloheptenone in a water miscible organic solvent, for example, ethanol, tetrahydrofuran or acetone, acetone being preferred. The solution or suspension is heated to reflux and an aqueous solution of the appropriate quantity of chromous chloride is added thereto. Heating is continued under reflux suitably under nitrogen, for about 30 minutes to about 4 hours suitably for about 30 minutes to about 3 hours, and the desired 5H-dibenzocyclohepten-5-one is isolated.

In one mode of isolation, the acetone is removed by distillation, suitably under reduced pressure, water added to the residue, and the mixture extracted with a water immiscible organic solvent, suitably a polar solvent such as chloroform or the like. Removal of the solvent under pressure that is reduced yields the desired product in crystalline form.

Alternatively chloroform is added to the hot solution, the layers separated and the aqueous layer extracted with chloroform and the combined chloroform extracts worked up as before. In this mode it is important to add the chloroform while the reaction mixture is warm to prevent troublesome premature crystallization of the product.

Although this invention has been described with respect to its preferred embodiments. It should be understood that many variations and modifications will now be obvious to those skilled in the art, and it is preferred, therefore, that the scope of the invention be limited, not by the specific disclosure herein, only by the appended claim.

EXAMPLE 1

4-methylsulfonyl-2-stilbenecarbonyl chloride (a) A slurry of 302.4 g. of 4-methylsulfonyl-2-stilbene carboxylic acid in 1500 ml. of methylene chloride is treated with 2 ml. of pyridine and 145 ml. of thionyl chloride. The mixture is heated to reflux for 30 minutes. A vigorous evolution of gas is noted and a clear solution is formed. Thereafter the mixture is heated under reflux for a further 30 minutes, cooled in an icebath and the precipitate separated by filtration. The product is washed with a small amount of cold methylene chloride and dried overnight at 50° C. in vacuo to yield 4-methylsulfonyl-2-stilbenecarbonyl chloride m.p. 167–170° C.

(b) 40 g. of 4-methylsulfonyl-2-stilbene carboxylic acid are taken up in a solution of 40 ml. of thionyl chloride in 400 ml. of benzene. 2 ml. of pyridine are added, and the slurry heated to reflux to yield a clear solution, the mixture is heated under reflux for 30 minutes and cooled in an ice bath to yield a crystalline slurry; 200 ml. of hexane are added, the mixture stirred, filtered, and washed with 100 ml. of 1:1 benzene/hexane. The residue is dried overnight at 50° C. in vacuo to yield 4-methylsulfonyl-2-stilbenecarbonyl chloride m.p. 167–170° C.

EXAMPLE 2

5-methylsulfonyl-2-(2-phenyl-1,2-dibromoethyl)-benzoyl chloride

A slurry of 9.62 g. of 4 - methylsulfonyl - 2 - stilbenecarbonyl chloride in 45 ml. of nitroethane is cooled in a Dry Ice/methanol cooling bath in apparatus equipped with means to exclude moisture and light.

8.5 ml. of 3.2 M bromine solution in nitroethane is added at a reaction mixture temperature of −10° to −20° C. over 20 minutes. The reaction mixture is stirred in the dark for about 2 hours to give a clear light red solution. The reaction mixture is then permitted to warm to room temperature and sparged with nitrogen for 1 hour to yield a solution of 5-methylsulfonyl-2-dibromophenethylbenzoyl chloride.

Removal of the solvents under reduced pressure yields the product in crystalline form.

EXAMPLE 3

5-methylsulfonyl-2-(2-phenyl-1,2-dichloroethyl) benzoyl chloride 4-methylsulfonyl-2-stilbenecarbonyl chloride as prepared in accordance with Example 1 is taken up in three liters of methylene chloride. The reaction vessel is cooled in an ice/water bath, and 1.08 moles of chlorine introduced through a sparger. After addition of the chlorine, the solution is sparged with nitrogen to remove excess chlorine to yield a solution of 5-methylsulfonyl-2-(2-phenyl-1,2-dichloroethyl)benzoyl chloride which is utilized in the next stage of the reaction.

EXAMPLE 4

3-methylsulfonyl-10,11-dihydro-5H-dibenzo[a,d] cyclohepten-5-one

A solution of 332 g. of aluminum chloride in 664 ml. of nitroethane is prepared by adding portions of solid aluminum chloride to the well stirred nitroethane at a temperature of between 25° C. and 40° C. The solution is then cooled to between 0° and 5° C. and added to the solution of 5-methylsulfonyl-2-(2-phenyl-1,2-dichloroethyl)benzoyl chloride prepared in Example 3, which is initially at the same temperature of the reaction mixture and which rises to about 15° C. and is then heated under reflux for 4 hours. The reaction is then cooled in an ice/methanol bath, and the temperaute held below 30° C. during the addition of 4300 ml. of water.

The two phase mixture is thoroughly stirred, warmed gently (not above 40° C.) and the methylene chlorine removed by distillation under reduced pressure. The slurry thus produced is filtered without cooling, washed with water, and dried under vacuum at 50° C. to yield the desired 3-methylsulfonyl - 10,11 - dichloro-10,11-dihydro-5H-dibenzo[a,d]cyclohepten-5-one.

In accordance with the foregoing procedure but starting with 5-methylsulfonyl-2-(2-phenyl - 1,2 - dibromoethyl) benzoyl chloride there is obtained the corresponding 3-methylsulfonyl - 10,11 - dibromo - 10,11 - dihydro - 5H-dibenzo[a,d]cyclohepten-5-one.

EXAMPLE 5

3-methylsulfonyl-5H-dibenzo[a,d]cyclohepten-5-one

To a solution of 10 g. of 3-methylsulfonyl-10,11-dichloro - 10,11 - dihydro - 5H - dibenzo[a,d]cyclohepten-5-one in 46 ml. of acetone under reflux there is added rapidly a solution of 46 ml. of 2.5 M chromous chloride solution (prepared as described below). The reaction mixture is heated under reflux with stirring for 30 minutes, 75 ml. of chloroform added thereto and the phases separated while still warm. The aqueous phases are extracted with a further amount of chloroform, the combined organic layers dried over sodium sulfate, filtered, and the solvents removed in vacuo. The residue is the desired 3-methylsulfonyl-5H-dibenzo[a,d]cyclohepten-5-one.

Recrystallization from acetic acid followed by washing with acetic acid, acetic acid/hexane, and hexane in sequence, and drying in vacuo at 50° C. yields 3-methylsulfonyl-5H-dibenzo[a,d]cyclohepten - 5 - one m.p. 161–163° C.

In accordance with the foregoing procedure but starting with 3-methylsulfonyl-10,11-dibromo-10,11-dihydro-5H-dibenzo[a,d]cyclohepten-5-one there is obtained the same product.

Preparation of Chromous Chloride Solution

A mixture of 231 g. of coarse chromium and 266.5 g. of chromic chloride hexahydrate in 500 ml. of water are heated with stirring to 50° C. in an atmosphere of nitrogen. 145 ml. of hydrochloric acid (175 mole) are added slowly over 2 hours, the temperature being permitted to rise between 60° C. and 70° C. On completion of the addition, the reaction mixture is cooled to 25° C. and decanted from the excess chromium under nitrogen.

The strength of the solution may be determined by titration against a standard ferric solution. If the solution is not used at once, it should be diluted to a strength of 2.0 M with deaerated water and stored at 0 to 5° C. until use.

EXAMPLE 6

5H-dibenzo[a,d]cyclohepten-5-one

A solution of 1.00 gm. of 2(2-phenyl-1,2-dibromomethyl)benzoyl chloride in 10 ml. of methylene chloride is added to a slurry of 2.50 gm. aluminum chloride in 20 ml. of methylene chloride. After stirring for 5 hours at room temperature the reaction mixture is concentrated in vacuo below 20° C. to an amorphous solid. The black-brown solid mass changes to yellow crystals on quenching with 20 ml. of water. The product is filtered and washed with 10 ml. of water, 5 ml. of saturated sodium bicarbonate and with 10 ml. of water to yield after drying in vacuo at 50° C., 5H-dibenzo[a,d]cyclohepten-5-one.

EXAMPLE 7

3-methylsulfonyl-5H-dibenzo[a,d]cyclohepten-5-one 1 g. of 5-methylsulfonyl-2-(2-phenyl-1,2-dibromoethyl) benzoyl chloride are dissolved in 10 ml. of methylene chloride and added to a slurry of 2.5 grams of aluminum and 20 ml. of methylene chloride. 1 ml. of phosphorus trichloride is added and the mixture stirred at 25° C. for 5 hours. The mixture is concentrated to dryness under reduced pressure, and cautiously quenched with water. The resultant mixture is filtered, the residue triturated with saturated aqueous sodium bicarbonate solution, washed with water, and dried under reduced pressure to yield 0.6 grams of 3-methylsulfonyl-5H-dibenzo[a,d]cyclohepten-5-one, m.p. 135 to 147° C.

EXAMPLE 8

3-methylsulfonyl-5H-dibenzo[a,d]cyclohepten-5-one 10 g. of 3-methylsulfonyl-10,11-dichloro-10,11-dihydro-5H-dibenzo[a,d]cyclohepten-5-one is taken up in 100 ml. of pyridine and heated under reflux with stirring for 1 hour. The solution is then concentrated to approximately 10 to 20 ml. under reduced pressure, 75 ml. of chloroform and 100 ml. of water added thereto. The mixture is warmed to 40° C., and the phases separated. The aqueous layer is further extracted with chloroform and the chloroform extract combined, washed with saturated aqueous sodium bicarbonate, water, and dried over sodium sulfate, filtered, and the solvent removed under reduced pressure to yield the desired 3-methylsulfonyl-5H-dibenzo[a,d] cyclohepten-5-one.

In accordance with the foregoing procedure but starting with 3-methylsulfonyl-10,11-dibromo-10,11-dihydro-5H-dibenzo[a,d]cyclohepten-5-one, there is obtained the same product.

What is claimed is:

1. A process for the preparation of 3-methylsulfonyl-5H-dibenzo[a,d]cyclohepten-5-one which comprises dehalogenating a dihalodibenzocycloheptenone compound selected from the group consisting of 3-methylsulfonyl-10,11-dichloro - 10,11 - dihydro-5H-dibenzo[a,d]cyclohepten-5-one and 3-methylsulfonyl-10,11-dibromo-10,11-dihydro-5H-dibenzo[a,d]cyclohepten-5-one by contacting said dihalo compound with about 2 to 5 moles of chromous chloride per mole of said dihalo compound in a water-miscible organic solvent and heating the resulting mixture to the reflux temperature whereby the desired product is produced in substantially quantitative yield.

References Cited

UNITED STATES PATENTS 3,448,102    6/1969    Yale et al. _____ 260—590

DANIEL D. HORWITZ, Primary Examiner

U.S. Cl. X.R.

260—511; 252—441